United States Patent
Osuga et al.

(10) Patent No.: US 9,071,750 B2
(45) Date of Patent: Jun. 30, 2015

(54) SEMICONDUCTOR INTEGRATED CIRCUIT AND MULTI-ANGLE VIDEO SYSTEM

(75) Inventors: Hiroshi Osuga, Kanagawa (JP);
Takaaki Suzuki, Kanagawa (JP);
Atsushi Kiuchi, Kanagawa (JP);
Kazuhide Kawade, Kanagawa (JP);
Hiroyuki Hamasaki, Kanagawa (JP)

(73) Assignee: RENESAS ELECTRONICS CORPORATION, Kawasaki-shi (JP)

( * ) Notice: Subject to any disclaimer, the term of this patent is extended or adjusted under 35 U.S.C. 154(b) by 422 days.

(21) Appl. No.: 13/274,324

(22) Filed: Oct. 15, 2011

(65) Prior Publication Data
US 2012/0105679 A1    May 3, 2012

(30) Foreign Application Priority Data

Oct. 27, 2010    (JP) ................. 2010-240444

(51) Int. Cl.
| H04N 5/76 | (2006.01) |
| H04N 7/18 | (2006.01) |
| H04L 12/50 | (2006.01) |
| H04N 5/232 | (2006.01) |
| H04N 5/247 | (2006.01) |
| H04N 5/357 | (2011.01) |
| H04N 5/77 | (2006.01) |
| H04N 5/907 | (2006.01) |

(52) U.S. Cl.
CPC ........... *H04N 5/23238* (2013.01); *H04N 5/247* (2013.01); *H04N 5/3572* (2013.01); *H04N 5/77* (2013.01); *H04N 5/907* (2013.01)

(58) Field of Classification Search
None
See application file for complete search history.

(56) References Cited

U.S. PATENT DOCUMENTS

| 5,298,998 | A | * | 3/1994 | Furumiya et al. | 348/537 |
| 7,259,772 | B2 | * | 8/2007 | Koh | 345/659 |
| 7,362,955 | B2 | * | 4/2008 | Abiko et al. | 386/239 |
| 7,636,498 | B2 | * | 12/2009 | Furukawa et al. | 382/303 |
| 8,077,203 | B2 | * | 12/2011 | Abe | 348/148 |

(Continued)

FOREIGN PATENT DOCUMENTS

| JP | 2008-306402 A | 12/2008 |
| JP | 2009-171537 A | 7/2009 |

(Continued)

OTHER PUBLICATIONS

Office Action issued Apr. 24, 2014, in Japanese Application No. 2010-240444.

*Primary Examiner* — Dave Czekaj
*Assistant Examiner* — Kehinde O Abimbola
(74) *Attorney, Agent, or Firm* — Miles & Stockbridge P.C.

(57) ABSTRACT

The present invention is provided to lessen load on a bus in the case of storing image data captured by a plurality of cameras into a semiconductor memory. To a semiconductor integrated circuit, a plurality of cameras and a semiconductor memory can be coupled. The semiconductor integrated circuit includes a plurality of first interfaces, a second interface, a bus, and a plurality of image processing modules. The image processing modules include a process of performing distortion correction on image data in a pre-designated region, and writing the image data in the region subjected to the distortion correction into the semiconductor memory via the bus and the second interface. By excluding image data out of the pre-designated region from an object of distortion correction in the image processing modules, the amount of image data transferred to the semiconductor memory is reduced.

9 Claims, 15 Drawing Sheets

(56) References Cited

U.S. PATENT DOCUMENTS

| | | | |
|---|---|---|---|
| 8,161,339 B2* | 4/2012 | Furukawa et al. | 714/746 |
| 8,228,398 B2* | 7/2012 | Ejima et al. | 348/231.2 |
| 2002/0036717 A1* | 3/2002 | Abiko et al. | 348/700 |
| 2002/0041752 A1* | 4/2002 | Abiko et al. | 386/46 |
| 2002/0141623 A1* | 10/2002 | Zavaljevski et al. | 382/128 |
| 2003/0091040 A1* | 5/2003 | Furukawa | 370/375 |
| 2005/0159189 A1* | 7/2005 | Iyer | 455/566 |
| 2006/0033760 A1* | 2/2006 | Koh | 345/649 |
| 2006/0072874 A1* | 4/2006 | Johnston | 385/25 |
| 2006/0109474 A1* | 5/2006 | Imura | 356/446 |
| 2007/0025636 A1* | 2/2007 | Furukawa et al. | 382/275 |
| 2007/0029492 A1* | 2/2007 | Abe | 250/370.09 |
| 2007/0296654 A1* | 12/2007 | Huang | 345/87 |
| 2008/0012952 A1* | 1/2008 | Lee | 348/211.11 |
| 2008/0040642 A1* | 2/2008 | Furukawa et al. | 714/746 |
| 2008/0084581 A1* | 4/2008 | Kobayashi et al. | 358/1.16 |
| 2008/0158364 A1* | 7/2008 | Miyajima et al. | 348/207.1 |
| 2009/0033748 A1* | 2/2009 | Ejima et al. | 348/207.1 |
| 2009/0121851 A1* | 5/2009 | Abe | 340/435 |
| 2010/0328456 A1* | 12/2010 | Alakarhu | 348/139 |
| 2012/0147218 A1* | 6/2012 | Shirai | 348/231.3 |
| 2012/0212596 A1* | 8/2012 | Mathur | 348/77 |

FOREIGN PATENT DOCUMENTS

| | | |
|---|---|---|
| JP | 2009-239754 A | 10/2009 |
| JP | 2009-267603 A | 11/2009 |
| JP | 2010-183265 A | 8/2010 |

\* cited by examiner

FIG. 2

| IMAGES IN A TO D | A | B | C | D |
|---|---|---|---|---|
| | PROCESSES ON IMAGE 1 | PROCESSES ON IMAGE 2 | PROCESSES ON IMAGE 3 | PROCESSES ON IMAGE 4 |
| PROCESSES IN IMRS 15 TO 18 | IMR15 — EXECUTE DISTORTION CORRECTION ON DOTTED-LINE PART IN IMAGE A | IMR16 — EXECUTE DISTORTION CORRECTION AND 180-DEGREE TURN ON DOTTED-LINE PART IN IMAGE B | IMR17 — EXECUTE DISTORTION CORRECTION AND RIGHT-DIRECTION 90-DEGREE TURN ON DOTTED-LINE PART IN IMAGE C | IMR18 — EXECUTE DISTORTION CORRECTION AND LEFT-DIRECTION 90-DEGREE TURN ON DOTTED-LINE PART IN IMAGE D |
| IMAGES TO BE WRITTEN IN DDR 35 | FRONT  FRONT | BACK   BACK | RIGHT  RIGHT  RIGHT | LEFT  LEFT  LEFT |

FIG. 5(A) (1) DRAW COMMAND (TRiangle COMMAND)    TRANSFORM COORDINATES (u,v) STORED IN IMR LINE MEMORY TO (X,Y) AND STORE (X,Y) TO DDR

| 31 | ......... | 24 | 23 | ......... | 16 | 15 | ......... | 0 |
|---|---|---|---|---|---|---|---|---|
| OP CODE | | | | Reserved | | | | |
| | | | | u0 | | | | N |
| | | | | X0 | | | | v0 |
| | | | | u1 | | | | Y0 |
| | | | | X1 | | | | v1 |
| | | | | ......... | | | | Y1 |
| | | | | u(N−1) | | | | ......... |
| | | | | X(N−1) | | | | v(N−1) |
| | | | | | | | | Y(N−1) |

N: THE NUMBER OF VERTICES, THE NUMBER OF COORDINATES BEFORE TRANSFORMATION USED FOR DRAW COMMAND AND THE NUMBER OF COORDINATES AFTER TRANSFORMATION

FIG. 5(B) (2) SYNCW (SYNChronize Wait) COMMAND    WAIT FOR NEXT DL EXECUTION UNTIL CONDITION IS SATISFIED

| 31 | ......... | 24 | 23 | ......... | 17 | 16 | 15 | SEL | ......... | 0 |
|---|---|---|---|---|---|---|---|---|---|---|
| OP CODE | | | | Reserved | | | | | Reserved | |

SEL=1: WAIT FOR EXECUTION OF DL UNTIL IMAGE DATA IS STORED TO THE NUMBER OF LINE MEMORIES SET BY LSPR+LMSR AFTER RECEPTION OF VSYNC SIGNAL
SEL=0: WAIT FOR EXECUTION OF DL UNTIL IMAGE DATA IS STORED TO THE NUMBER OF LINE MEMORIES SET BY LMSR

FIG. 5(C) (3) TRAP COMMAND GENERATE INTERRUPTION TO CPU

| 31 | ......... | 24 | 23 | ......... | 0 |
|---|---|---|---|---|---|
| OP CODE | | | | Reserved | |

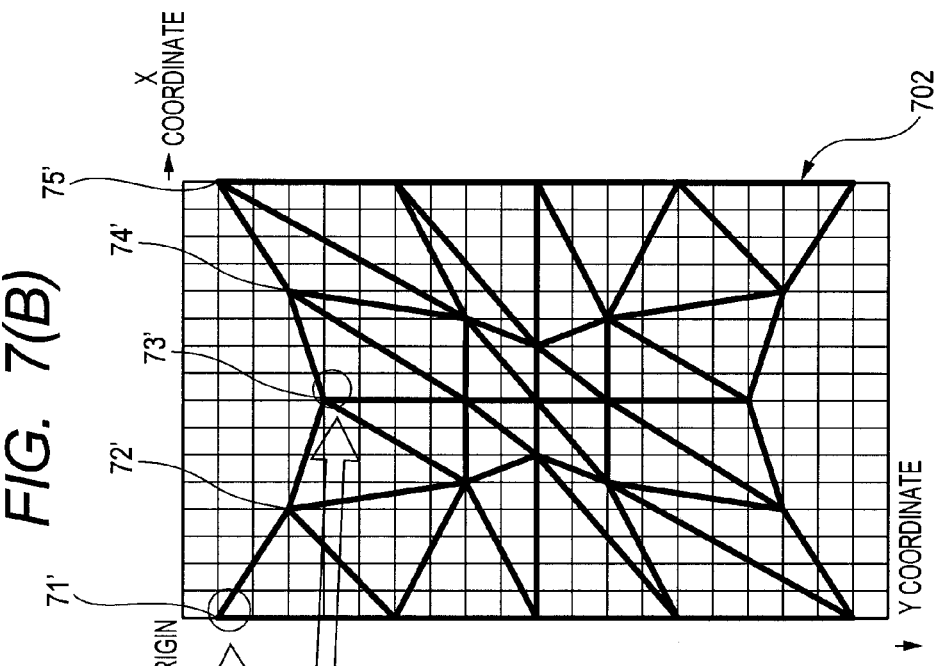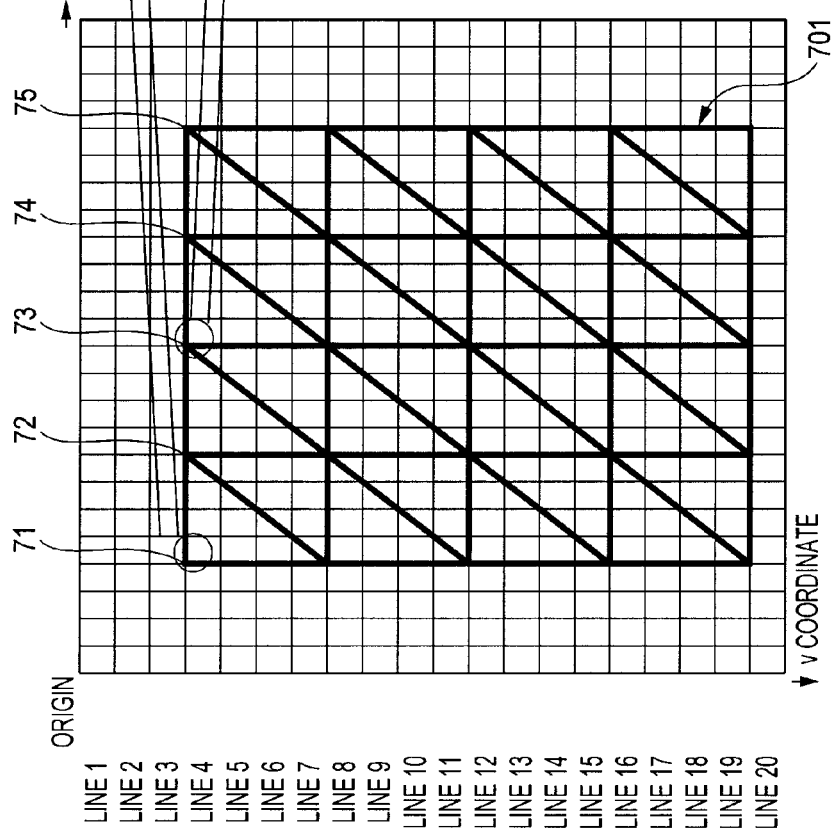

SEMICONDUCTOR INTEGRATED CIRCUIT AND MULTI-ANGLE VIDEO SYSTEM

CROSS-REFERENCE TO RELATED APPLICATIONS

The disclosure of Japanese Patent Application No. 2010-240444 filed on Oct. 27, 2010 including the specification, drawings and abstract is incorporated herein by reference in its entirety.

BACKGROUND

The present invention relates to a semiconductor integrated circuit for performing image process and a technique effectively applied to, for example, a multi-angle video system.

A multi-angle video system is known as a system that supports safe and smooth driving operation of a vehicle in a parking area and the like. The multi-angle video system generates an image (overview image) of a view of the periphery of the vehicle from the above of the vehicle on the basis of video images of the periphery taken by a plurality of in-vehicle cameras mounted on the vehicle, and displays the image on a display in the car. Documents describing techniques of this kind include Patent documents 1 and 2.

Patent document 1 describes a technique in which a camera having a fish-eye lens is used as an in-vehicle camera, only an image in a predetermined region to be used for generating a vehicle periphery image is extracted from an image formed on an image pickup face, the viewpoint of the extracted image is converted to an overview image, and obtained overview images are synthesized, thereby forming a vehicle peripheral image.

Patent document 2 describes an image processing apparatus for a vehicle, having a plurality of cameras, distortion correcting units corresponding to the cameras, and a projection transforming unit.

RELATED ART DOCUMENTS

Patent Documents

[Patent Document 1] Japanese Unexamined Patent Publication No. 2009-267603
[Patent Document 2] Japanese Unexamined Patent Publication No. 2009-171537

SUMMARY

One of methods of providing a single semiconductor chip with functions necessary for the operation of a system is SoC (System-on-a-Chip). The inventors of the present invention examined on application of the SoC to a multi-angle video system and found the following problem.

In a multi-angle video system, images captured by the plural in-vehicle cameras have to be buffered in a semiconductor memory. Specifically, the semiconductor memory is coupled to a bus in a processor. While image data captured by the plural in-vehicle cameras is sequentially stored in the semiconductor memory, the image data in the semiconductor memory is read and processed, and the resultant image data is displayed on a display device.

However, to fetch the image data captured by the plural in-vehicle cameras as it is in the semiconductor memory, the semiconductor memory needs enormous storage capacity, and the load on the bus by write and read accesses to the semiconductor memory inevitably becomes heavy. Particularly, in the case of the SoC, it is considered that other data processes using the bus are undesirably delayed due to the increase in the bus load by the write and read accesses to the semiconductor memory. In the patent documents 1 and 2, such a problem is not considered.

An object of the present invention is to provide a technique for lessening the load on the bus in the case of storing image data captured by a plurality of cameras into a semiconductor memory.

The above and other objects and novel features of the present invention will become apparent from the description of the specification and the appended drawings.

Outline of representative one of inventions disclosed in the present application will be briefly described as follows.

To a semiconductor integrated circuit, a plurality of cameras and a semiconductor memory can be coupled. The semiconductor integrated circuit includes a plurality of first interfaces for fetching image data captured by the cameras; a second interface enabling data to be transmitted/received to/from the semiconductor memory; and a bus to which the second interface is coupled. The semiconductor integrated circuit also includes a plurality of image processing modules disposed in correspondence with the first interfaces and for performing a predetermined data process on image data transmitted via the corresponding first interfaces. The image processing modules include a process of performing distortion correction on image data in a pre-designated region, and writing the image data in the region subjected to the distortion correction into the semiconductor memory via the bus and the second interface.

An effect obtained by the representative one of the inventions disclosed in the present application will be briefly described as follows.

The load on a bus in the case of storing image data captured by a plurality of cameras into a semiconductor memory can be lessened.

BRIEF DESCRIPTION OF THE DRAWINGS

FIG. 2 is an explanatory diagram of images in main parts of the processor illustrated in FIG. 1.

FIGS. 5A to 5C are format explanatory diagrams of a display list executed by the image processing module in the processor illustrated in FIG. 1.

FIGS. 7A and 7B are diagrams explaining distortion correcting process performed in a process block in the image processing module in the processor illustrated in FIG. 1.

DETAILED DESCRIPTION

1. Outline of Embodiment

Figure 1:
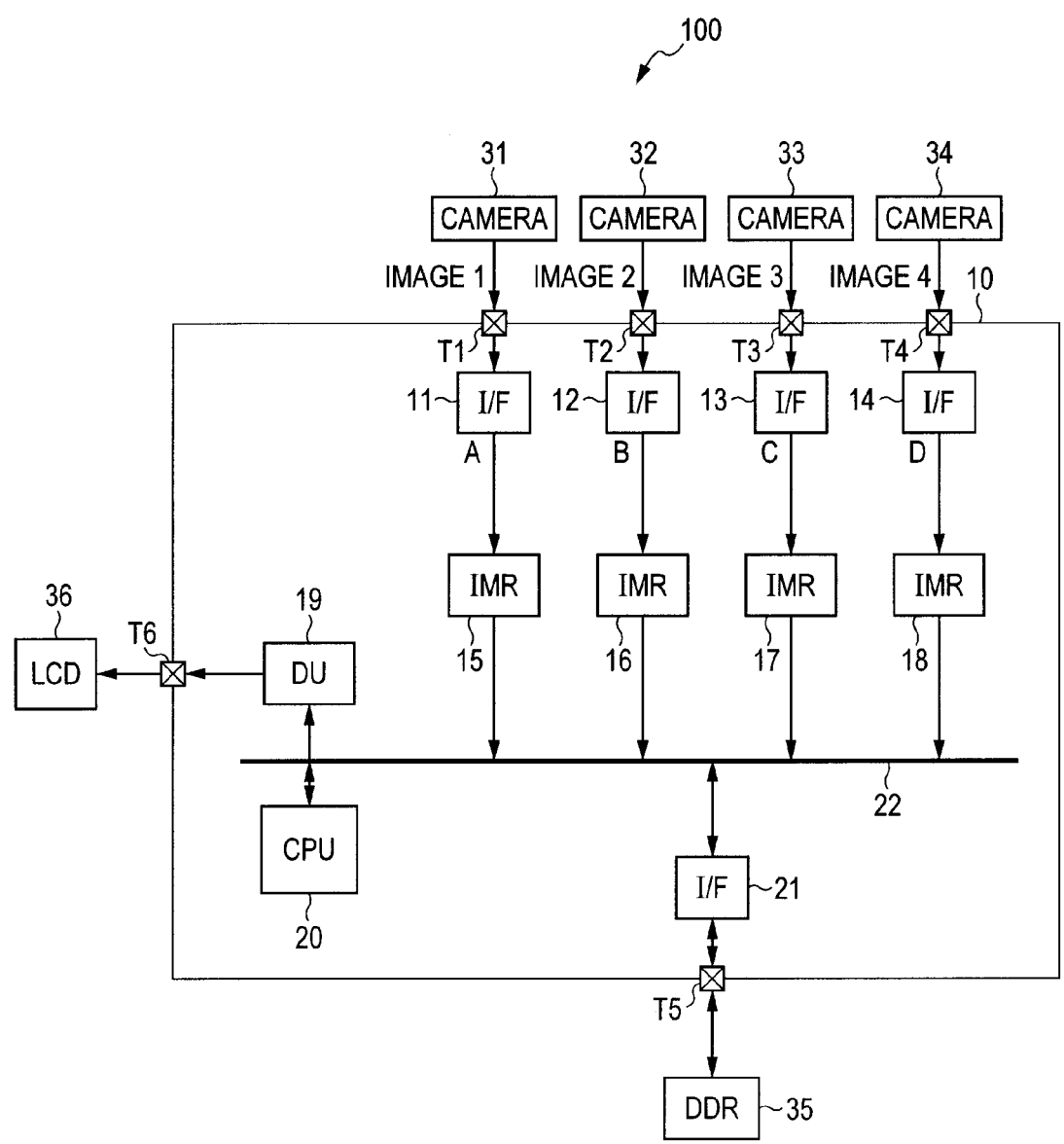
FIG. 1 is a block diagram showing an example of the configuration of a multi-angle video system including a processor as an example of a semiconductor integrated circuit according to the present invention.

First, outline of representative embodiments of the invention disclosed in the present application will be described. Reference numerals of the drawings referred to in parentheses in the description of the outline of the representative embodiments merely illustrate components designated with the reference numerals included in the concept of the components.

[1] To a semiconductor integrated circuit (10) according to a representative embodiment of the present invention, a plurality of cameras (31 to 34) and a semiconductor memory (35) can be coupled. The semiconductor integrated circuit includes: a plurality of first interfaces for fetching image data captured by the cameras; a second interface (21) enabling data to be transmitted/received to/from the semiconductor memory; and a bus (22) to which the second interface is coupled. The semiconductor integrated circuit also includes a plurality of image processing modules (15 to 18) disposed in correspondence with the first interfaces and for performing a predetermined data process on image data transmitted via the corresponding first interfaces. The image processing modules (15 to 18) include a process of performing distortion correction on image data in a pre-designated region, and writing the image data in the region subjected to the distortion correction into the semiconductor memory via the bus and the second interface.

With the configuration, distortion correction is performed on image data in a pre-designated region by a plurality of image processing modules, and the image data in the region subjected to the distortion correction is written in the semiconductor memory via the bus and the second interface. Consequently, by excluding the image data out of the pre-designated region from an object of distortion correction in the image processing modules, the amount of image data transferred from the image processing modules to the semiconductor memory via the bus and the second interface can be largely reduced, the load on the bus due to the write access to the semiconductor memory can be lessened, and other data processes using the bus are not undesirably delayed. The image processing module executes a process of performing distortion correction on image data in a pre-designated region and writing the image data in the region subjected to the distortion correction into the semiconductor memory via the bus and the second interface, so that the process of extracting the image data in the pre-designated region and the process of performing the distortion correction on the image in the region extracted can be simultaneously performed. Therefore, as compared with the case of separately performing the process of extracting image data in a pre-determined region and the process of performing the distortion correction on the image in the region extracted by different process blocks, the speed of the process can be increased.

[2] To display an image processed in the semiconductor integrated circuit on a display device, the semiconductor integrated circuit in [1] may be provided with a display control unit (19) for fetching image data processed by the plural image processing modules, synthesizing the image data, and displaying the resultant image data on a display device.

[3] In the semiconductor integrated circuit [2], the image processing module may include: a line memory (41) for storing image data received via the first interfaces; a display list buffer (43) for storing a display list which is preliminarily formed; and a process block (42) for performing the distortion correction on image data in the line memory in accordance with the display list.

[4] In the semiconductor integrated circuit [3], in the display list, a first command (draw command) for instructing coordinate transformation of image data stored in the line memory and storage of the coordinate-transformed image data into the semiconductor memory and a second command (SYNCW command) for making execution of a next display list waited until a predetermined condition is satisfied can be written. In the display list, a third command (TRAP command) for generating a predetermined interruption signal at a timing point when image data of one screen is obtained by process in the process block can be also written. The first, second, and third commands are executed in the process block.

[5] The semiconductor integrated circuit of [4] may further include a central processing unit (20) coupled to the bus. The central processing unit includes a process of writing corresponding image data in the semiconductor memory into the display control unit via the bus by an interrupting process corresponding to an interruption signal caused by the third command in the display list.

[6] The semiconductor integrated circuit of [5] may be further provided with a port (151) capable of outputting a sync signal for controlling the image capturing timings of the plural cameras to the outside in order to make the image capturing timings of the plural cameras proper.

[7] A multi-angle video system (100) can be configured by the semiconductor integrated circuit of [6] and the plural cameras and the semiconductor memory coupled to the semiconductor integrated circuit.

2. Details of Embodiments

The embodiments will be described more specifically.

First Embodiment

FIG. 1 illustrates a multi-angle video system including a processor as an example of a semiconductor integrated circuit according to the present invention. A multi-angle video system 100 illustrated in FIG. 1 includes a processor 10, a plurality of cameras 31 to 34, a semiconductor memory (DDR) 35, and a display device (LCD) 36.

The processor 10 is, although not limited, an SoC provided with functions necessary for the operation of the multi-angle video system, and is formed on a single semiconductor substrate such as a single-crystal silicon substrate by the known semiconductor integrated circuit manufacturing technique. The processor 10 illustrated in FIG. 1 is provided with camera coupling terminals T1 to T4, a semiconductor memory coupling terminal T5, and a display device coupling terminal T6. The cameras 31 to 34 are coupled to the camera coupling terminals T1 to T4, respectively. The cameras 31 to 34 are attached to a vehicle to capture images on the front, rear, right and left sides of the vehicle. As each of the cameras 31 to 34, a camera having a fish-eye lens can be applied. The fish-eye lens has the angle of view of about 180 degrees and can display an image of a wide range. The image is distorted and, particularly, distortion in a periphery part of the image is considerable, so that distortion correction is performed. A technique itself for correcting the distortion caused by the fish-eye lens is known (refer to, for example, patent document 1). The semiconductor memory (DDR) 35 is, although not limited, a DDR SDRAM (Double-Data-Rate Synchronous Dynamic Random Access Memory) which can transmit/receive data at each of the rising/trailing edges of a clock signal and can obtain data transfer speed which is twice as high as that of an SDRAM operating at the same clock theoretically. The display device (LCD) 36 is a liquid crystal display in a vehicle.

The processor 10 illustrated in FIG. 1 includes, although not limited, interfaces 11 to 14 and 21, image processing modules (IMR) 15 to 18, a display control unit (DU) 19, and a central processing unit (CPU) 20. The image processing units (IMRs) 15 to 18, the display control unit 19, the central processing unit 20, and the interface 21 are coupled so that a signal can be transmitted/received from each other via a bus 22. The interfaces 11 to 14 are coupled to the camera coupling terminals T1 to T4, respectively and fetch image data from the corresponding cameras 31 to 34. The interface 21 is disposed in correspondence with the semiconductor memory coupling terminal T5 so that data can be transmitted/received to/from the semiconductor memory 35. The image processing modules 15 to 18 are disposed in correspondence with the interfaces 11 to 14, respectively and have the functions of performing distortion correction on image data in a pre-designated region and writing the distortion-corrected image data in the region into the semiconductor memory 35 via the interface 21. The image processing modules 15 to 18 can correct not only distortion but also brightness and hue. The display control unit 19 fetches the image capturing data subjected to the distortion correction process in the semiconductor memory 35 via the interface 21, performs superimposing process on the data, and outputs the process result to the display device 36. The central processing unit 20 performs operation control on each of the components by executing a predetermined program. The operation control includes initial setting to registers in the image processing modules 15 to 18 and the display control unit 19, setting of a display list (DL) to the semiconductor memory 35, switching of the data storage region in the semiconductor memory 35 to which the image data processed by the image processing modules 15 to 18 is to be stored, and re-setting of a data fetch address in the display control unit 19.

FIG. 2 schematically shows images in main parts of the processor 10 illustrated in FIG. 1.

Figure 3:
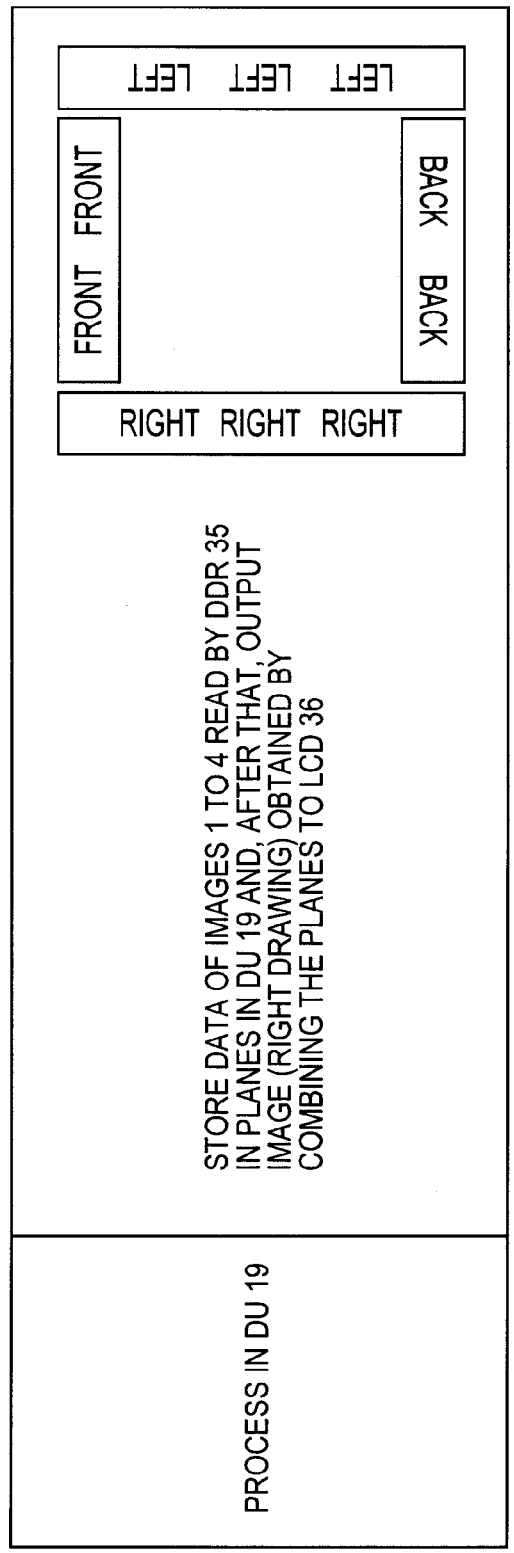
FIG. 3 is an explanatory diagram of the images processed by the processor illustrated in FIG. 1.

Images 1, 2, 3, and 4 are obtained by image capturing in the cameras 31 to 34 each having a fish-eye lens. It is assumed that the image 1 on the front side of the vehicle is captured by the camera 31, the image 2 on the rear side of the vehicle is captured by the camera 32, the image 3 on the right side of the vehicle is captured by the camera 33, and the image 4 on the left side of the vehicle is captured by the camera 34. The image data is transmitted to the image processing modules 15, 16, 17, and 18 via the corresponding interfaces 11, 12, 13, and 14, respectively. A, B, C, and D in FIG. 2 indicate the images captured by the cameras 31, 32, 33, and 34, respectively, supplied to the processor 10 via the terminals T1, T2, T3, and T4, respectively, and output from the interfaces 11, 12, 13, and 14, respectively. In the image processing module 15, distortion caused by the fish-eye lens is corrected on the image in the pre-designated region (the region surrounded by the dotted line) in the input image 1 (image A), and the image in the region subjected to the distortion correction is written in the semiconductor memory 35. In the image processing module 16, distortion caused by the fish-eye lens is corrected on the image in the pre-designated region (the region surrounded by the dotted line) in the input image 2 (image B), the image in the region subjected to the distortion correction is turned by 180 degrees, and the resultant image is written in the semiconductor memory 35. In the image processing module 17, distortion caused by the fish-eye lens is corrected on the image in the pre-designated region (the region surrounded by the dotted line) in the input image 3 (image C), the image in the region subjected to the distortion correction is turned rightward by 90 degrees, and the resultant image is written in the semiconductor memory 35. In the image processing module 18, distortion caused by the fish-eye lens is corrected on the image in the pre-designated region (the region surrounded by the dotted line) in the input image 4 (image D), the image in the region subjected to the distortion correction is turned leftward by 90 degrees, and the resultant image is written in the semiconductor memory 35. The images written in the semiconductor memory 35 are read by the display control unit 19. In the display control unit 19, the images read from the semiconductor memory 35 are stored in planes in the display control unit 19, the images in the planes are synthesized so as to be disposed in predetermined positions, for example, as shown in FIG. 3, and the resultant image is transmitted and displayed in the display device 36.

Figure 4:
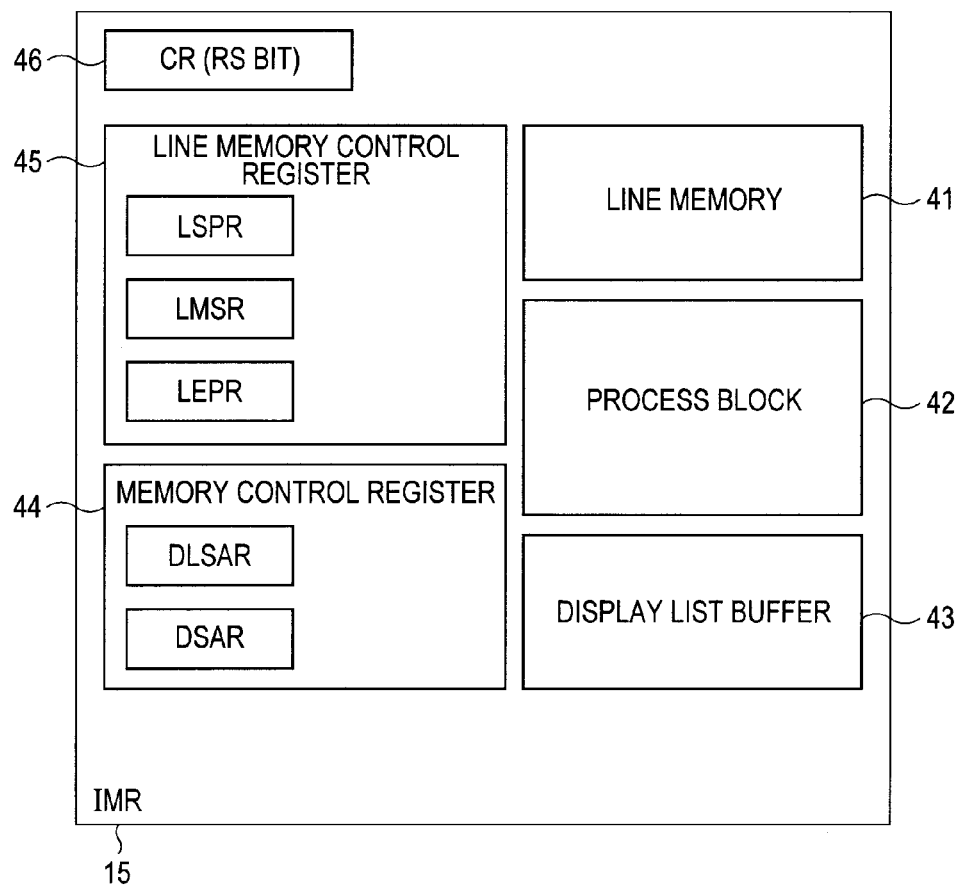
FIG. 4 is a block diagram showing an example of the configuration of an image processing module in the processor illustrated in FIG. 1.

FIG. 4 illustrates an example of the configuration of the image processing module 15.

The image processing module 15 includes, although not limited, a line memory 41, a process block 42, a display list buffer 43, a memory control register 44, a line memory control register 45, and an IMR control register (CR) 46.

The line memory 41 is a memory for storing image data supplied via the interface 11 in correspondence with a scan line in a display system.

The process block 42 performs distortion correction on the image data in the pre-designated region. The process block 42 can also correct the brightness and hue on the image data in the region. The process in the process block 42 is performed in accordance with the predetermined display list (DL). The process block 42 has the DMA (Direct Memory Access) function, and the image data processed by the process block 42 is written in the image memory 35 via the bus 22 and the interface 21 by the DMA function.

The display list is a list of the processes performed in the process block 42. The display list is preliminarily set and stored in the semiconductor memory 35, and is fetched by the image processing module 15 into the display list buffer 43 as necessary.

The memory control register 44 is a register used for control on the semiconductor memory 35 and includes a DL start address register DLSAR and a destination start address register DSAR. The DL start address register DLSAR holds the head address of a storage region in which the display list is stored in the semiconductor memory 35. The destination start address register DSAR holds the head address of a storage region in which the data subjected to distortion correction is stored in the semiconductor memory 35.

The line memory control register 45 is a register used for control on the line memory 41 and includes the head line designation register LSPR, the mesh size register LMSR, and the end line designation register LEPR. The head line designation register LSPR is a register for setting the number of line memories for cancelling a wait state set by an SYNCW (SYNChronize Wait) command. The mesh size register LMSR is a register for setting the number of line memories for cancelling the wait state set by the SYNC command. The end line designation register LEPR is a register for setting the number of line memories for uncancelling the wait state set by the SYNCW command.

The IMR control register 46 has a rendering start bit (RS bit). When the rendering start bit is set to the logic value "1", the display list is read from the address set in the DL start address register DLSAR and written in the display list buffer 43.

Since the other image processing modules 16 to 18 have the same configuration as that of the image processing module 15, their detailed description will not be given.

FIGS. 5A to 5C illustrate a format of a display list.

In a display list, although not limited, a draw command (TRIangl command), an SYNCW (SYNChronize Wait) command, and a TRAP command are written.

The draw command is a command for instructing transformation of coordinates of image data stored in the line memory 41 in the image processing module from the u,v coordinate system to an X,Y coordinate system as another system, and storage of the resultant to the semiconductor memory 35. In the coordinate transformation, only the image data in a necessary region in the image data stored in the line memory 41 is extracted and subjected to distortion correction. That is, at the time of transformation from the u,v coordinate system to the X,Y coordinate system, extraction of an image in a necessary region (extraction of an image in a designated region) and distortion correction on the image in the region are performed. In the coordinate transformation in the image processing modules 16 to 18, in relation to image display in the display device 36, 180-degree turn process and 90-degree turn process are also executed (refer to FIGS. 2 and 3). The draw command is made of 32 bits as shown in FIG. 5A and made by a plurality of lines. In the 0th to 15th bits in the first line, the number N of vertices indicative of the number of coordinates (u,v) before transformation and coordinates (X,Y) after transformation used in the draw command is assigned. The 16th to 23rd bits are reserved. An operation code (OP CODE) indicative of the draw command is assigned to the 34th to 31st bits. The number of lines from the second line and subsequent lines in the draw command is twice as many as the number N of vertices (=N×2). The reason is that the coordinates (u,v) before transformation and the coordinates (X,Y) after transformation are alternately described. For example, in the case of FIG. 5A, it is instructed to transform the coordinates (coordinates before transformation) (u0, v0) to the coordinates (coordinates after transformation) (X0, Y0), transform the coordinates (u1,v1) to the coordinates (X1,Y1), and transform the coordinates (u(N−1),v(N−1)) to the coordinates (X(N−1),Y(N−1)).

The SYNCW command is a command for making execution of the next display list (DL) waited until the condition is satisfied. The SYNCW instruction is made of 32 bits as shown in FIG. 5B. The 0th to 15th bits are reserved, an SEL bit indicative of wait for execution of the display list is assigned in the 16th bit, the 17th to 23rd bits are reserved, and an operation code indicative of the SYNCW command is assigned to the 24th to 31st bits. In the case where the SEL bit is the logical value "1", after a vertical sync signal VSYNC of the image display system is received, execution of the display list is made waited until image data is stored to the number of line memories indicated by the total value (LSPR+LMSR) of the set value of LSPR and the set value of LMSR. In the case where the SEL bit is the logical value "0", execution of the display list is made waited until image data of the number of line memories which is set in the register LMSR is stored.

The TRAP command is a command for generating interruption to the CPU 20 and is made of 32 bits as shown in FIG. 5C. The 0th to 23rd bits in the TRAP command are reserved, and an operation code indicative of the TRAP command is assigned to the 24th to 31st bits.

Figure 6:
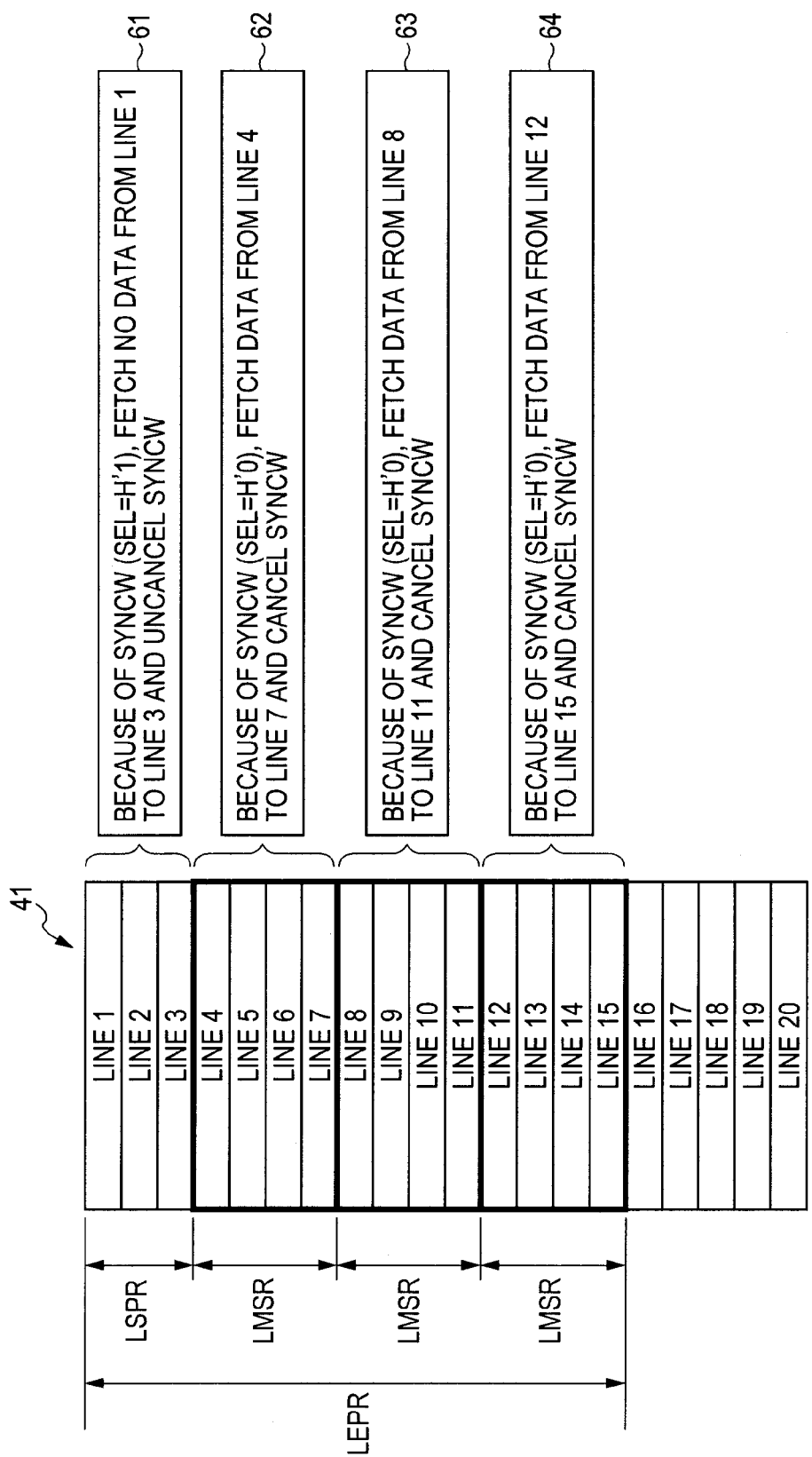
FIG. 6 is a diagram for explaining the relations among a line memory in the image processing module in the processor illustrated in FIG. 1, a head line designation register, a mesh size register, an end line designation register, and an SYNCW command.

FIG. 6 illustrates the relations among the line memory 41, the head line designation register LSPR, the mesh size register LMSR, the end line designation register LEPR, and the SYNCW command. As an example, it is assumed that "3" is set in the head line designation register LSPR, "4" is set by the mesh size register LMSR and "15" is set in the end line designation register LEPR. In the case where the SEL bit in the SYNCW command in the fetched display list is the logical value "1", execution of the display list is waited until image data is stored to the number of line memories indicated by LSPR+LMSR (=3+4). Consequently, data from line 1 to line 3 is not taken in the process block 42, and the SYNCW command is not cancelled (61). When image data is stored to the number of line memories set by LSPR+LMSR (=3+4) and the SYNCW command is cancelled because of satisfaction of the condition, the next display list is fetched. In the case where the SEL bit in the fetched SYNCW command is the logical value "0", image data up to the number of lines set by LMSR, that is, from line 4 to line 7 is taken in the process block 42, and the SYNCW command is cancelled (62). When the SEL bit in the SYNCW command fetched next is the logical value "0", image data of the number of lines set by LMSR, that is, from line 8 to line 11 is taken in the process block 42, and the SYNCW command is cancelled (63). Similarly, in the case where the SEL bit in the SYNCW command fetched next is the logical value "0", image data of the number of lines set by LMSR, that is, from line 12 to line 15 is taken in the process block 42, and the SYNCW command is cancelled (64). Since "15" is set in the end line designation register LEPR in the example, image data in the line 16 and subsequent lines is not taken in the process block 42.

FIGS. 7A and 7B schematically show distortion correcting process performed in the process block 42.

FIG. 7A illustrates an image stored in the line memory 41, and FIG. 7B shows an image subjected to the distortion correction and stored in the semiconductor memory 35. In the line memory 41, an image captured by a camera is written. An object of the distortion correction is an image in a region as a part of the image stored in the line memory 41. In the example shown in FIG. 7A, an image 701 stored in the region from the fourth line to the 19th line is an object of the distortion correction and is taken in the process block 42. The distortion correction is performed at the time of transforming the coordinates of the image data stored in the line memory 41 from the u,v coordinate system to the X,Y coordinate system as a different system. That is, an image 702 which is distortion-corrected can be obtained by modifying the coordinates in consideration of the characteristic of the camera having the fish-eye lens in the coordinate transformation from the u,v coordinate system to the X,Y coordinate system. Vertices 71 to 75 in the image 701 correspond to vertices 71' to 75' in the distortion-corrected image 702. The coordinate transformation for distortion correction is determined by the draw command (refer to FIG. 5A) in the display list.

In the case where the distortion correcting process on a partial region as shown in FIGS. 7A and 7B is not performed in the image processing modules 15 to 18 in the configuration illustrated in FIG. 1, image data obtained by image capturing of the cameras 31 to 34 is written in the same size into the semiconductor memory 35 via the bus 22 and the interface 21. In this case, the load on the bus 22 due to a write access and a read access to the semiconductor memory 35 becomes heavier. Particularly, in the case of SoC, it is considered that other data processes using the bus 22 are undesirably delayed due to increase in the load on the bus 22 caused by the write access to the semiconductor memory 35.

On the other hand, in the configuration shown in FIG. 1, the image 701 stored from the fourth line to the 19th line in the image data stored in the line memory 41 is an object of the distortion correction. Moreover, a process object in the u-coordinate direction (the horizontal direction in the diagram) of the u,v coordinate system of the image stored in the line memory 41 is limited by coordinates (u,v) designated in the drawing command (refer to FIG. 5A). In such a manner, a region as a process object of the distortion correction is specified. The region as a process object of the distortion correction is determined in consideration of the size of the image synthesized by the display control unit 19 and displayed in the display device 36. That is, image data of a region unnecessary for performing the image display as shown in FIG. 3 is excluded from the object of distortion correction in the image processing modules 15 to 18. By the operation, the amount of image data transferred from the image processing modules 15 to 18 to the semiconductor memory 35 via the bus 22 and the interface 21 can be largely reduced. Consequently, the load on the bus 22 caused by the write access to the semiconductor memory 35 can be lessened, and undesired delay in other data processes using the bus 22 is prevented.

Figure 8:
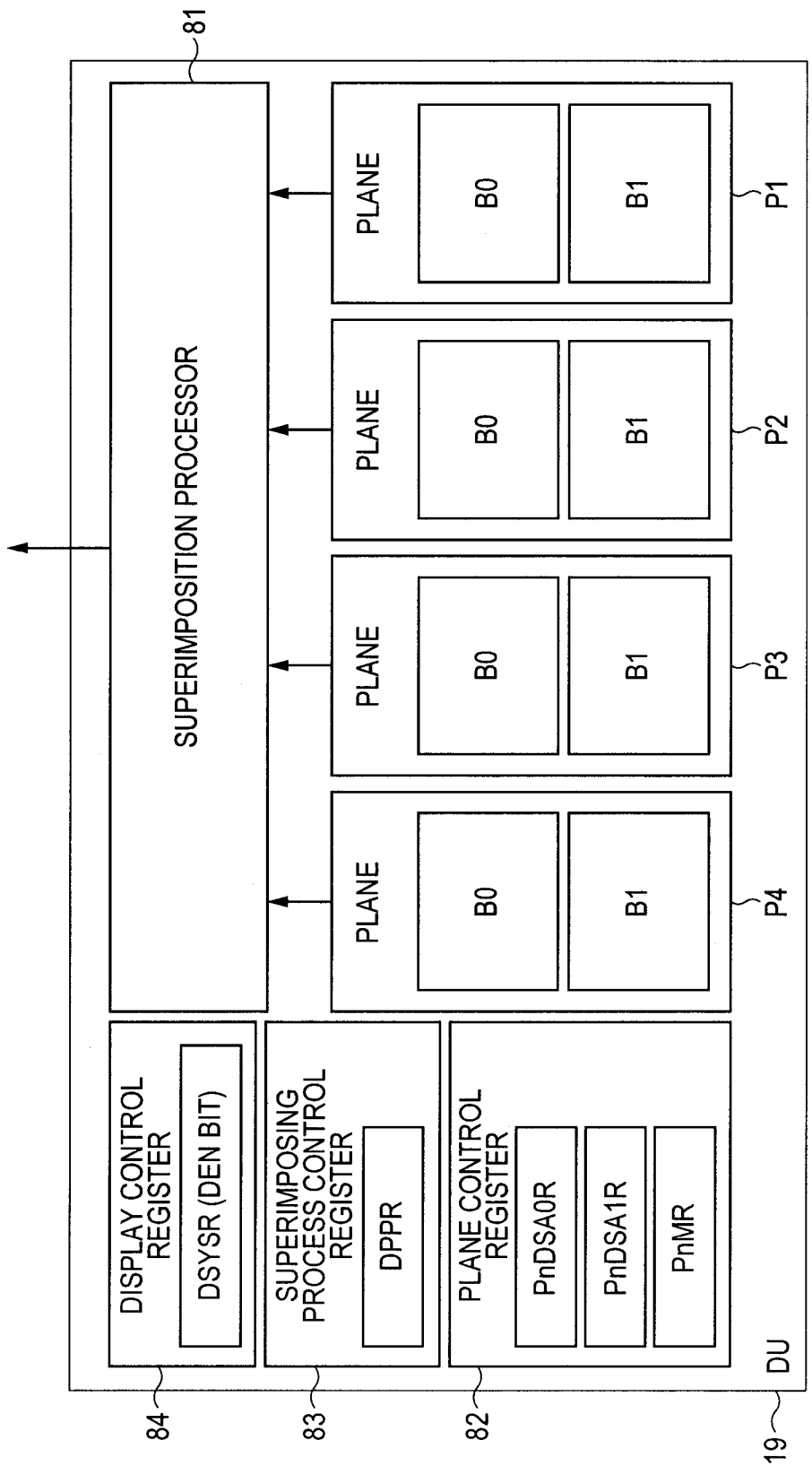
FIG. 8 is a block diagram showing an example of the configuration of a display control unit included in the processor illustrated in FIG. 1.

FIG. 8 shows an example of the configuration of the display control unit 19.

The display control unit 19 includes the planes P1 to P4, a superimposition processor 81, a plane control register 82, a superimposition process control register 83, and a display control register 84.

The planes P1 to P4 indicate display planes each including to buffers B0 and B1. In the buffers B0 and B1, image data subjected to the distortion correction in the process block 42 is written. The purpose of providing the two buffers B0 and B1 is to smooth the input/output of image data of each plane by allowing data held in one of the buffers B0 and B1 to be read during a period in which image data is written in the other buffer.

The superimposition processor 81 superimposes image data which is output from the planes P1 to P4 and outputs the resultant image data to the display device 36.

The plane control register 82 is provided to control the operation of the planes P1 to P4 and includes plane display region start address registers PnDSA0R and PnDSA1R and a plane mode register PnMR. Four plane display region start address registers PnDSA0R, four plane display region start address registers PnDSA1R, and four plane mode register PnMR are disposed for the planes P1 to P4. That is, the plane display region start address register PnDSA0R includes P1DSA0R, P2DSA0R, P3DSA0R, and P4DSA0R corresponding to the planes P1, P2, P3, and P4, respectively. The plane display region start address register PnDSA1R includes P1DSA1R, P2DSA1R, P3DSA1R, and P4DSA1R corresponding to the planes P1, P2, P3, and P4, respectively. Similarly, the plane mode register PnMR includes P1MR, P2MR, P3MR, and P4MR corresponding to the planes P1, P2, P3, and P4, respectively. In the plane display region start address register PnDSA0R, the display region start address of the buffer B0 in each of the planes P1, P2, P3, and P4 is set. In the plane display region start address register PnDSA1R, the display region start address of the buffer B1 in each of the planes P1 to P4 is set. In the plane mode register PnMR, a buffer (B0 or B1) for outputting image data to the superimposition processor 81 in the planes P1 to P4 is set.

The superimposition process control register 83 is to control the operation of the superimposition processor 81 and includes a display plane priority register DPPR. In the display plane priority register DPPR, the on/off state of display in the planes P1 to P4 and priority of superimposition are set.

The display control register 84 is to control image display in the display device 36 and includes a display system control register DSYSR in which a display enable (DEN) bit can be set. When the display enable (DEN) bit is set in the enable state, image data is fetched in the buffer in a corresponding plane from an address set in the plane display region start address register PnDSA0R or PnDSA1R.

Figure 9:
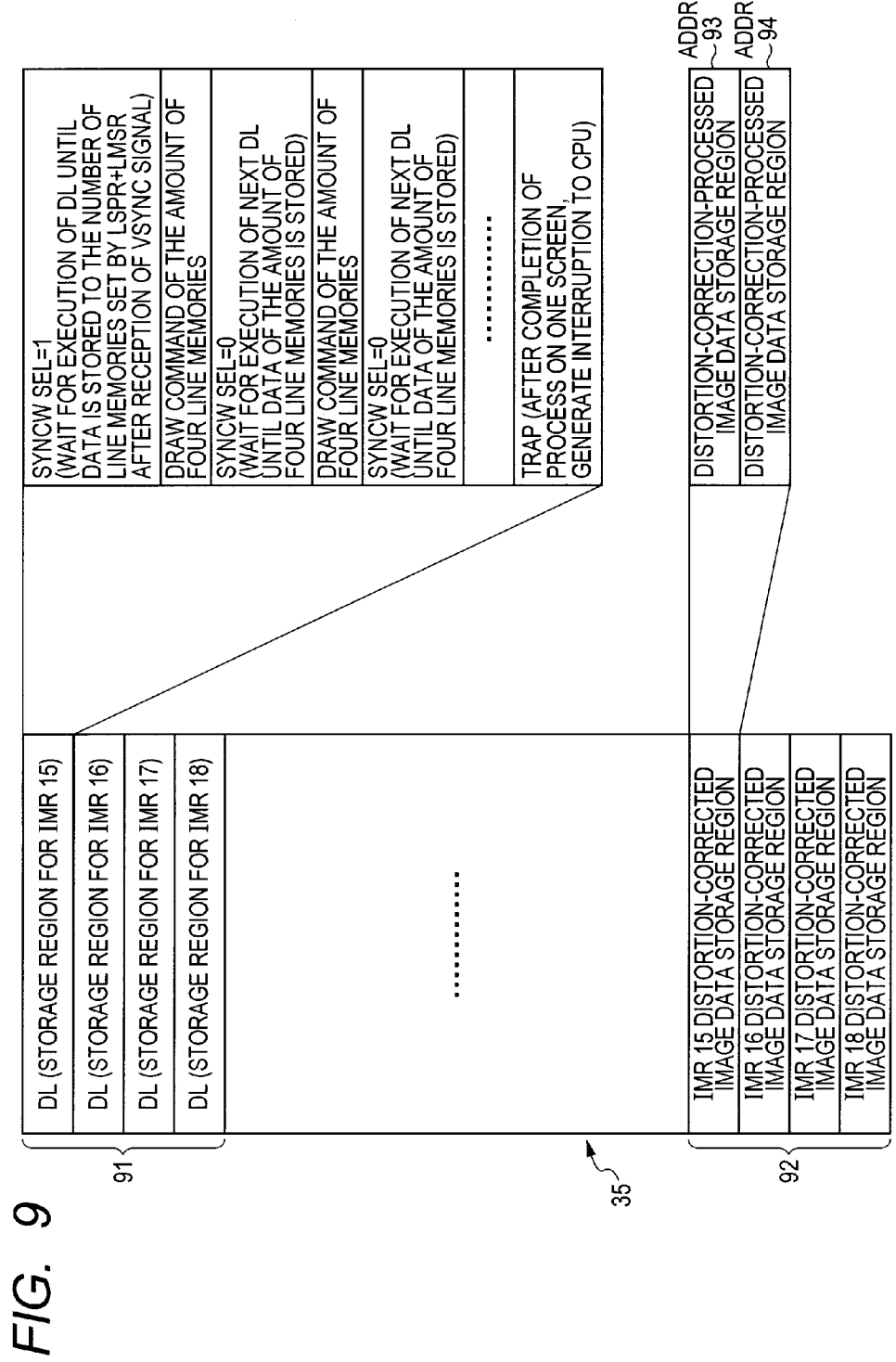
FIG. 9 is a diagram explaining storage regions in a semiconductor memory included in the multi-angle video system illustrated in FIG. 1.

FIG. 9 illustrates storage regions in the semiconductor memory 35.

In the semiconductor memory 35, a display list storage region 91 for storing a display list (DL) and a distortion-corrected image data storage region 92 for storing a distortion-corrected image data are formed.

The display list storage region 91 includes an IMR 15 storage region for storing a display list for the image processing module 15, an IMR 16 storage region for storing a display list for the image processing module 16, an IMR 17 storage region for storing a display list for the image processing module 17, and an IMR 18 storage region for storing a display list for the image processing module 18. In the IMR 15 storage region, the IMR 16 storage region, the IMR 17 storage region, and the IMR 18 storage region, as the IMR 15 storage region is representatively shown, a display list including the SYNCW command, the draw command, and the TRAP command is stored.

The distortion-corrected image data storage region 92 includes an IMR 15 distortion-corrected image data storage region, an IMR 16 distortion-corrected image data storage region, an IMR 17 distortion-corrected image data storage region, and an IMR 18 distortion-corrected image data storage region. In the IMR 15 distortion-corrected image data storage region, distortion-corrected image data from the image processing module 15 is stored. In the IMR 16 distortion-corrected image data storage region, distortion-corrected image data from the image processing module 16 is stored. In the IMR 17 distortion-corrected image data storage region, distortion-corrected image data from the image processing module 17 is stored. In the IMR 18 distortion-corrected image data storage region, distortion-corrected image data from the image processing module 18 is stored. In each of the IMR 15 distortion-corrected image data storage region, the IMR 16 distortion-corrected image data storage region, the IMR 17 distortion-corrected image data storage region, and the IMR 18 distortion-corrected image data storage region, as the IMR 15 distortion-corrected image data storage region is representatively shown, two distortion-corrected image data storage regions 93 and are included. The head address of the distortion-correction-processed image data storage region 93 is set to "10" and the head address of the distortion-correction-processed, image data storage region 94 is set to "11".

Figure 10:
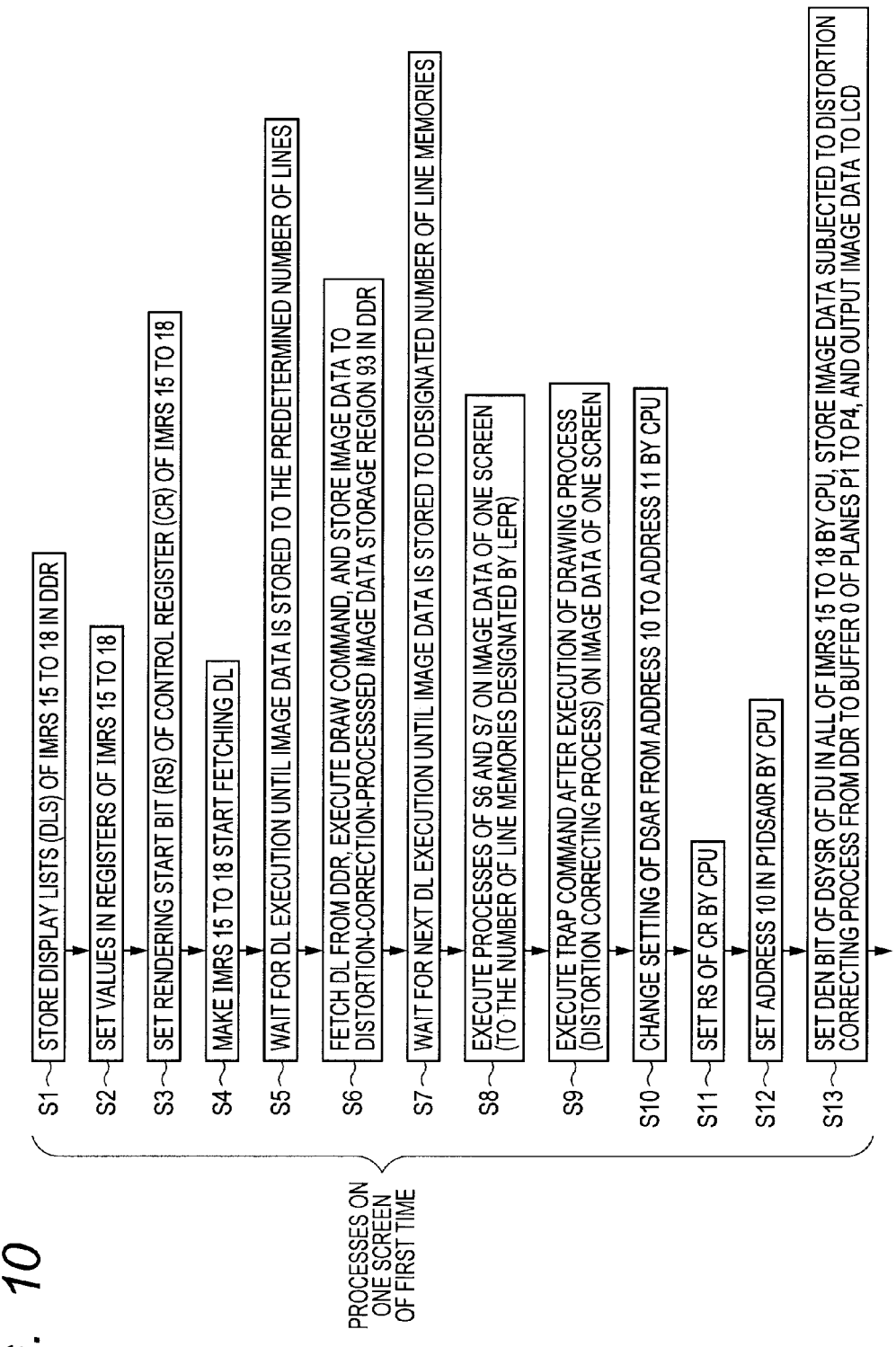
FIG. 10 is a flowchart of processes in the processor illustrated in FIG. 1.
Figure 11:
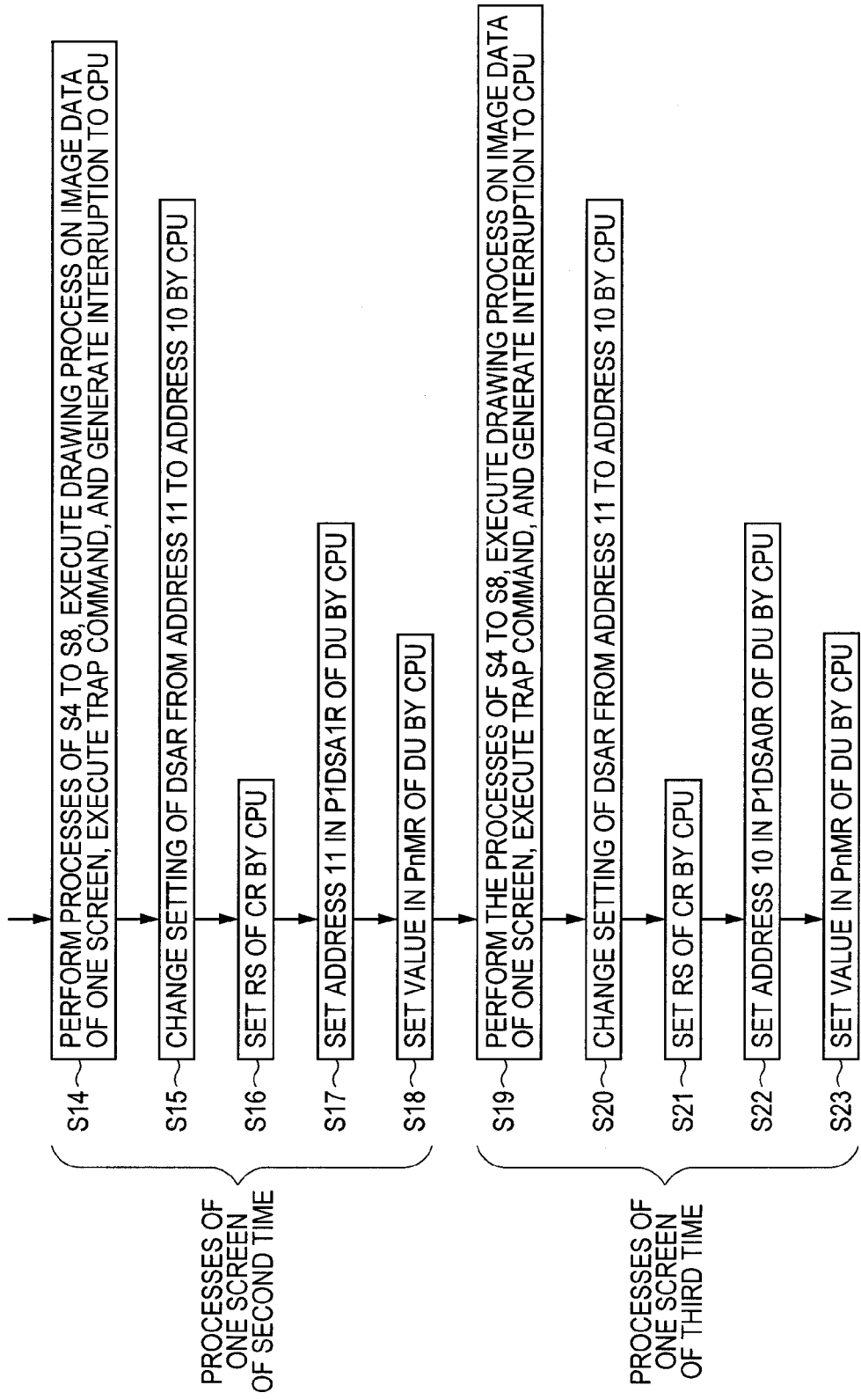
FIG. 11 is a flowchart of processes in the processor illustrated in FIG. 1.

FIGS. 10 and 11 show flowcharts of processes in the processor 10. The processes shown in FIG. 10 and those shown in FIG. 11 are continuous.

It is assumed that the plane P1 corresponds to the image processing module (IMR) 15, the plane P2 corresponds to the image processing module (IMR) 16, the plane P3 corresponds to the image processing module (IMR) 17, and the plane P4 corresponds to the image processing module (IMR) 18.

First, with reference to FIG. 10, the processes of one screen of the first time will be described.

By the central processing unit 20, display lists (DL) of the image processing modules (IMRs) 15 to 18 are stored in the semiconductor memory (DDR) 35 (S1).

By the central processing unit 20, a predetermined value is set in each of the registers (refer to FIG. 4) in the image processing modules 15 to 18 (S2). In the destination start address register DSAR in each of the image processing modules 15 to 18, the head address of the distortion-correction-processed image data storage region 93 in the semiconductor memory 35 is set. In the example shown in FIG. 9, the head address of the distortion-correction-processed image data storage region 93 in the semiconductor memory 35 is "address 10".

To make the image processing modules 15 to 18 start fetching the display lists, the central processing unit 20 sets a rendering start (RS) bit in the IMR control register (CR) 46 in each of the image processing modules 15 to 18 (S3).

After the above-described settings are made, the image processing modules 15 to 18 start fetching the display lists from the semiconductor memory 35 and sequentially execute the fetched display lists (S4). At this time, the SEL bit in the SYNCW command in the display list fetched by the image processing modules 15 to 18 is set to the logical value "1". In the case where the SEL bit in the SYNCW command executed is the logical value "1", the image processing modules 15 to 18 wait to fetch the next display list until image data is stored in the line memory 41 to the number of line memories indicated by the total value (LSPR+LMSR) of the set value of LSPR and the set value of LMSR since the vertical sync signal VSYNC of the image display system is supplied (S5).

When image data is stored to the number of line memories indicated by the total value (LSPR+LMSR) of the set value of LSPR and the set value of LMSR in the line memory 41, the image processing modules 15 to 18 fetch a display list from the semiconductor memory 35 and execute the draw command (TRIangl command) in the display list (S6). For example, as shown in FIGS. 7A and 7B, the draw command transforms the coordinates of image data stored in the line memory 41 in the image processing module from the u,v coordinate system to the X,Y coordinate system as another system and stores the transformed image data to the semiconductor memory 35. In the destination start address register DSAR in the image processing modules 15 to 18, since the head address of the distortion-correction-processed image data storage region 93 in the semiconductor memory 35 is set to the "address 10", the image data subjected to the coordinate transformation by the execution of the draw command is stored in order from the "address 10" in the image data storage region 93. In the coordinate transformation in the image processing modules 16 to 18, 180-degree turning process and 90-degree turning process are also executed. After the process in step S6, fetching of the next display list is started. Since the SEL bit in the fetched SYNCW command is the logical value "0", the execution of the display list is waited until image data is stored to the number of line memories indicated by LMSR (S7).

The processes in the steps S6 and S7 are repeated to the number of line memories designated by the end line designation register LEPR, in other words, until image data of the amount of one screen is obtained (S8).

In the image processing modules 16 to 18, after image data of the amount of one screen is obtained, the TRAP command in the display list is executed, and an interruption to the central processing unit 20 is generated (S9). By a predetermined interrupting process corresponding to the interruption, the central processing unit 20 changes the distortion-correction-processed image data storage region in the semiconductor memory 35 from the region until then to another region (S10). For example, in the case where the TRAP command is executed by the image processing module 15 and an interruption to the central processing unit 20 is generated, in the interrupting process in the central processing unit 20, the head address (address 11) of the distortion-correction-processed image data storage region 94 in the semiconductor memory 35 is set. By the setting, the storage region of image data subjected to the distortion correcting process in the image processing module 15 is changed from the distortion-correction-processed image data storage region 93 to the distortion-correction-processed image data storage region 94. Similarly, the TRAP command is executed also in the other image processing modules 16 to 18 and an interruption to the central processing unit 20 is generated, thereby changing the distortion-correction-processed image data storage region.

In the case where the TRAP command is executed in the image processing module 15 and an interruption to the central processing unit 20 is generated, the rendering start (RS) bit in the IMR control register (CR) 46 in the image processing module 15 is set by the central processing unit 20, and the above-described processes in the steps S4 to S8 are repeated (S11). Also in the case where the TRAP command is executed in the other image processing modules 16 to 18 and an interruption to the central processing unit 20 is generated, in a manner similar to the case of the image processing module 15, the processes in the steps S4 to S8 are repeated.

In the case where the TRAP command is executed in the image processing module 15 and an interruption to the central processing unit 20 is generated, the central processing unit 20 sets the head address (address 10) in the distortion-correction-processed image data storage region 93 in the semiconductor memory 35 in P1DSA0R in the plane display region start address register PnDSA0R (S12). By the setting, the image data in the distortion-correction-processed image data storage region 93 can be written in the buffer B0 in the plane P1 in the display control unit 19. Also in the case where the TRAP command is executed in the image processing modules 16 to 18 and the interruption to the central processing unit 20 is generated, in a manner similar to the case where the TRAP command is executed in the image processing module 15, the head address in the distortion-correction-processed image data storage region 93 in the semiconductor memory 35 is set.

In the case where the central processing unit 20 finishes the processes in the steps S10 to S12 on all of the image processing modules 15 to 18, the display enable (DEN) bit of the display system control register DSYSR in the display control register 84 in the display control unit 19 is set to the enable state, and image data is taken from the address set in the plane display region start address register to the buffer B0 in the corresponding plane P1, P2, P3, or P4 (S13). Further, the central processing unit 20 sets the display plane priority register DPPR. In the priority which is set in the display plane priority register DPPR, output data from the buffers B0 in the planes P1 to P4 is superimposed by the superimposition processor 81, and the resultant image is output and displayed in the display device 36 (S13).

The processes on one screen of the first time are performed by the steps S1 to S13.

Next, with reference to FIG. 11, the processes on one screen of the second time will be described.

In the processes on one screen of the second time, the processes corresponding to the steps S1 to S7 are unnecessary, and the processes in the steps S4 to S8 are performed. After execution of the drawing process on the image data of one screen, the TRAP command is executed, and an interruption to the central processing unit 20 is generated (S14). By the interruption, the central processing unit 20 changes the distortion-correction-processed image data storage region in the semiconductor memory 35 from the region until then to another region (S15). For example, in the case where the TRAP command is executed by the image processing module 15 and an interruption to the central processing unit 20 is generated, in the interrupting process in the central processing unit 20, the head address (address 10) of the distortion-correction-processed image data storage region 93 in the semiconductor memory 35 is set. By the setting, the storage region of image data subjected to the distortion correcting process in the image processing module 15 is changed from the distortion-correction-processed image data storage region 94 to the distortion-correction-processed image data storage region 93. Similarly, the TRAP command is executed also in the other image processing modules 16 to 18 and an interruption to the central processing unit 20 is generated, thereby changing the distortion-correction-processed image data storage region.

In the case where the TRAP command is executed in the image processing module 15 and an interruption to the central processing unit 20 is generated, the rendering start (RS) bit in the IMR control register (CR) 46 in the image processing module 15 is set by the central processing unit 20, and the above-described processes in the steps S4 to S8 are repeated again (S16).

In the case where the TRAP command is executed in the image processing module 15 and an interruption to the central processing unit 20 is generated, the central processing unit 20 sets the head address (address 11) in the distortion-correction-processed image data storage region 93 in the semiconductor memory 35 in P1DSA1R (corresponding to the plane 1) in the plane display region start address register PnDSA0R (S17). By the setting, the image data in the distortion-correction-processed image data storage region 93 is stored in the buffer B1 in the plane P1 in the display control unit 19. Also in the case where the TRAP command is executed in the image processing modules 16 to 18 and the interruption to the central processing unit 20 is generated, in a manner similar to the case where the TRAP command is executed in the image processing module 15, the head address in the distortion-correction-processed image data storage region 93 in the semiconductor memory 35 is set.

In the case where the TRAP command is executed in the image processing module 15 and an interruption to the central processing unit 20 is generated, the central processing unit 20 sets a value in the plane mode register PnMR in the display control unit 19 so that image data from the buffer B1 is output to the superimposition processor 81 at the time of outputting the next frame (S18). Also in the case where the TRAP command is executed in the image processing modules 16 to 18 and an interruption to the central processing unit 20 is generated, in a manner similar to the case where the TRAP command is executed in the image processing module 15, a value is set in the plane mode register PnMR.

Next, with reference to FIG. 11, the processes on one screen of the third time will be described.

In the processes on one screen of the third time, the processes corresponding to the steps S1 to S7 are unnecessary, and the processes in the steps S4 to S8 are performed. After execution of the drawing process on the image data of one screen, the TRAP command is executed, and an interruption to the central processing unit 20 is generated (S19). By the interruption, the central processing unit 20 changes the distortion-correction-processed image data storage region in the semiconductor memory 35 from the region until then to another region (S20). For example, in the case where the TRAP command is executed by the image processing module 15 and an interruption to the central processing unit 20 is generated, in the interrupting process in the central processing unit 20, the head address (address 11) of the distortion-correction-processed image data storage region 94 in the semiconductor memory 35 is set. By the setting, the storage region of image data subjected to the distortion correcting process in the image processing module 15 is changed from the distortion-correction-processed image data storage region 93 to the distortion-correction-processed image data storage region 94. Similarly, the TRAP command is executed also in the other image processing modules 16 to 18 and an interruption to the central processing unit 20 is generated, thereby changing the distortion-correction-processed image data storage region.

In the case where the TRAP command is executed in the image processing module 15 and an interruption to the central processing unit 20 is generated, the rendering start (RS) bit in the IMR control register (CR) 46 in the image processing module 15 is set by the central processing unit 20, and the above-described processes in the steps S4 to S8 are repeated (S21).

In the case where the TRAP command is executed in the image processing module 15 and an interruption to the central processing unit 20 is generated, the central processing unit 20 sets the head address (address 10) in the distortion-correction-processed image data storage region 93 in the semiconductor memory 35 in P1DSA0R (corresponding to the plane P1) in the plane display region start address register PnDSA0R (S22). The setting is made to store the image data in the distortion-correction-processed image data storage region 93 into the buffer B0 in the plane P1 in the display control unit 19. Also in the case where the TRAP command is executed in the image processing modules 16 to 18 and an interruption to the central processing unit 20 is generated, in a manner similar to the case where the TRAP command is executed in the image processing module 15, the head address in the distortion-correction-processed image data storage region 93 in the semiconductor memory 35 is set.

In the case where the TRAP command is executed in the image processing module 15 and an interruption to the central processing unit 20 is generated, the central processing unit 20 sets a value in the plane mode register PnMR in the display control unit 19 so that image data from the buffer B0 is output to the superimposition processor 81 at the time of outputting a next frame (S23). Also in the case where the TRAP command is generated in the image processing modules 16 to 18 and an interruption to the central processing unit 20 is generated, in a manner similar to the case where the TRAP command is executed in the image processing module 15, a value is set in the plane mode register PnMR.

The processes of one screen, of the first time (S1 to S13), the processes of one screen of the second time (S14 to S18), and the processes of one screen of the third time (S19 to S23) have been described above. With respect to the processes of one screen of the fourth and subsequent times, the processes (S14 to S18) of one screen of the second time (S14 to S18) and the processes (S19 to S23) of one screen of the third time are alternately repeated.

Second Embodiment

A second embodiment will be described.

Figure 12:
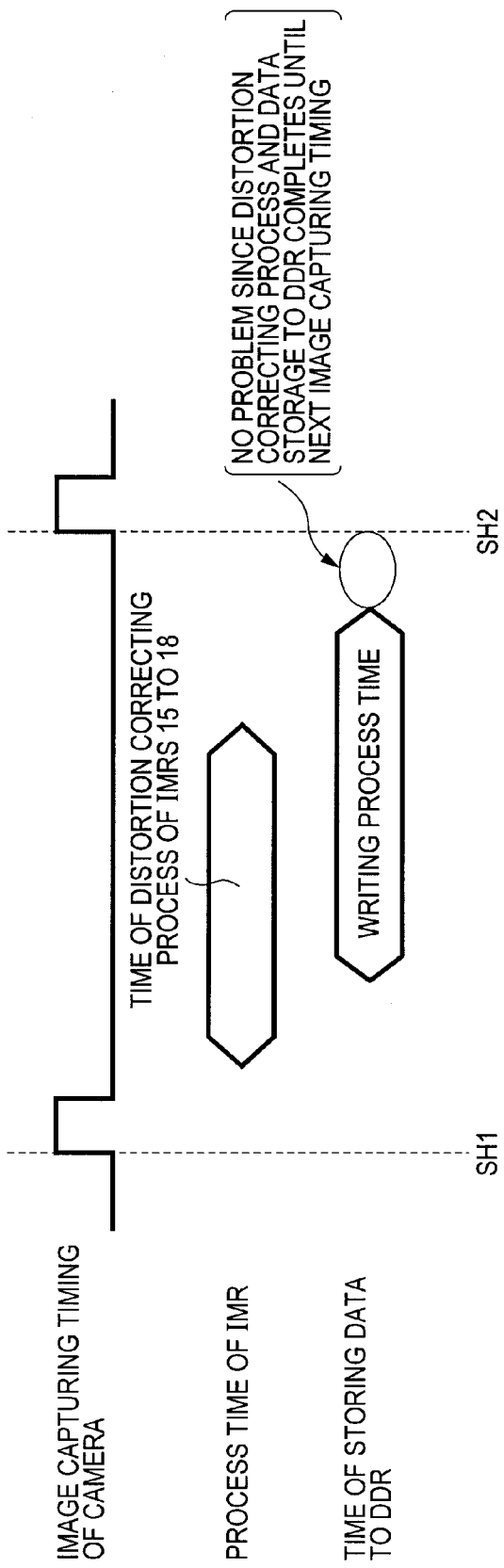
FIG. 12 is a diagram explaining the relations between image capturing timings of a camera in the multi-angle video system and time of storage of image data to the semiconductor memory.
Figure 13:
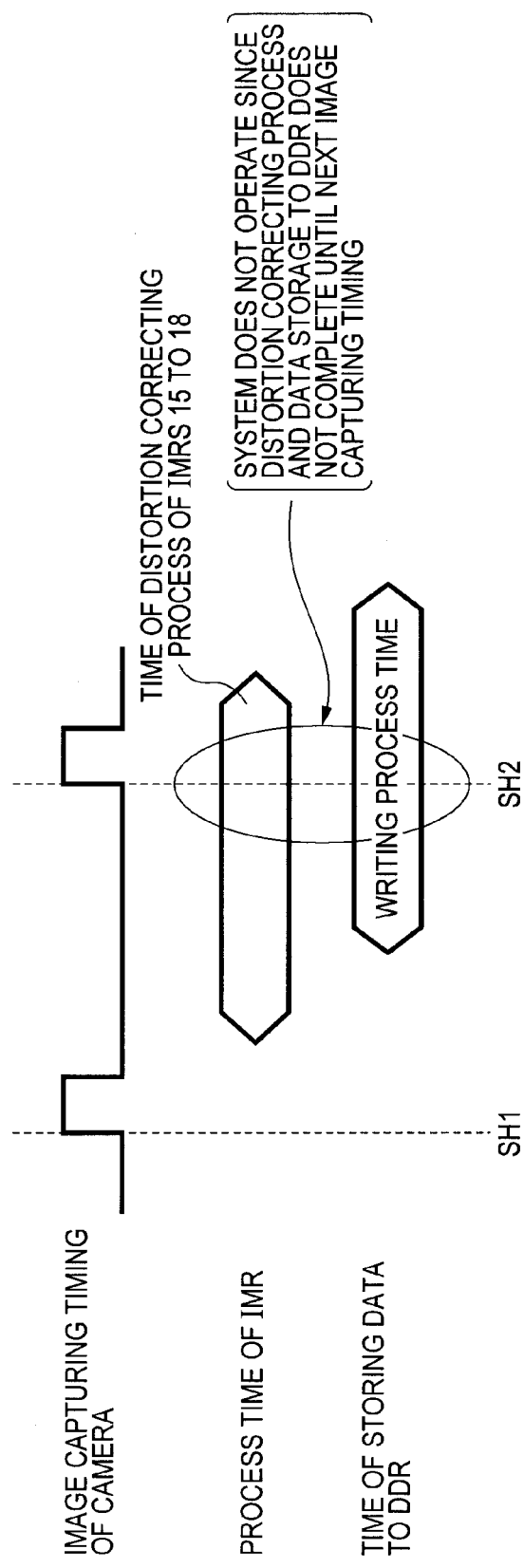
FIG. 13 is a diagram explaining the relations between image capturing timings of a camera in the multi-angle video system and time of storage of image data to the semiconductor memory.
Figure 14:
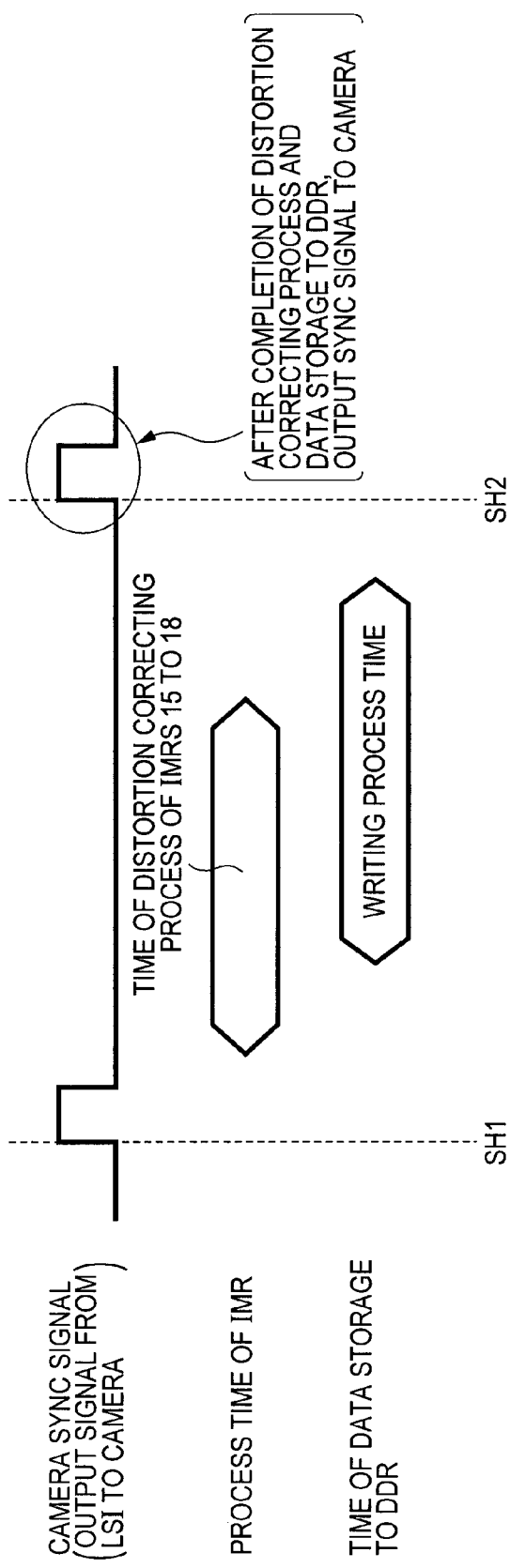
FIG. 14 is a diagram explaining the relations between image capturing timings of a camera and time of storage of image data to the semiconductor memory in the case of employing the configuration illustrated in FIG. 15.
Figure 15:
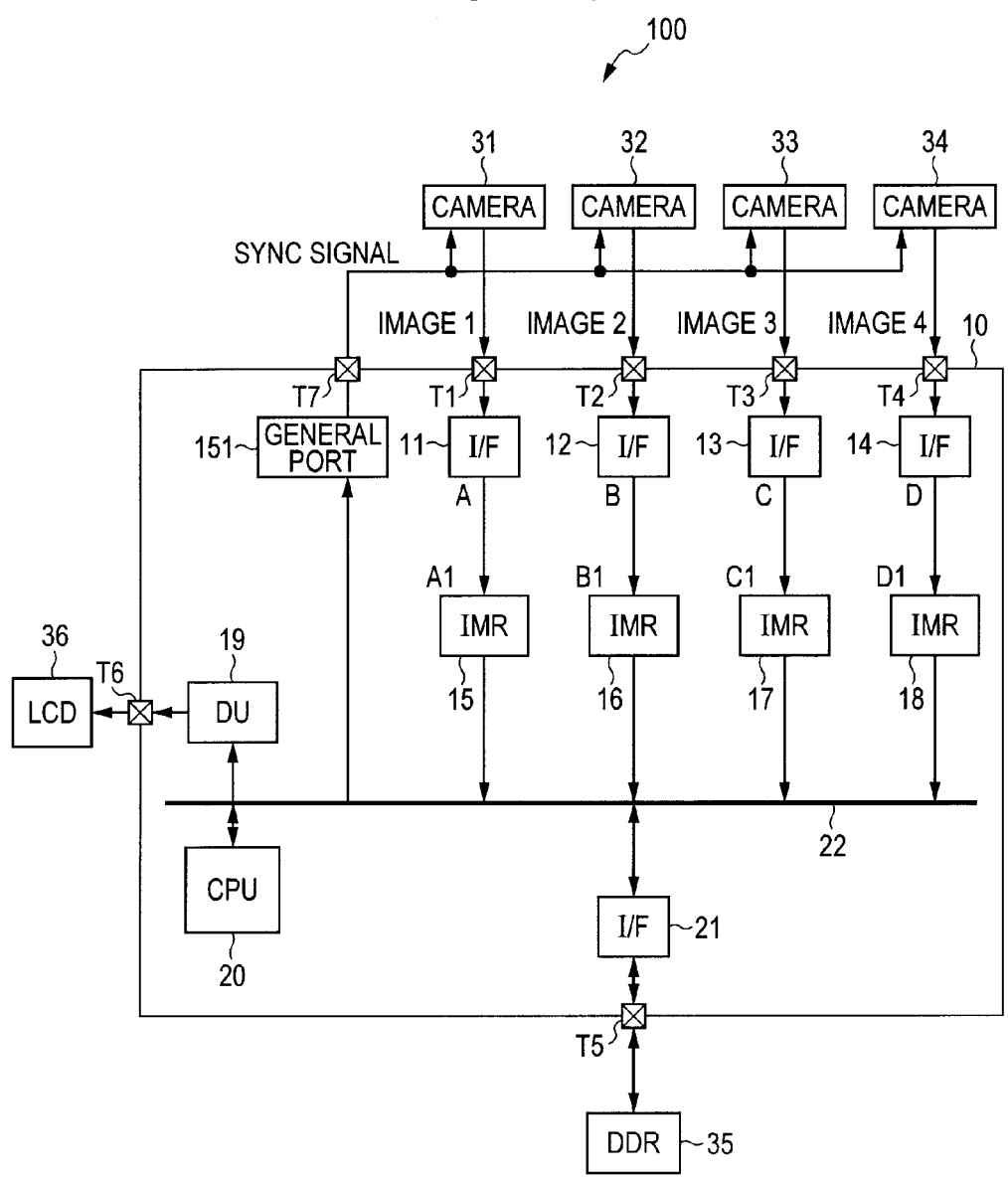
FIG. 15 is a block diagram showing an another configuration example of the multi-angle video system including the processor as an example of the semiconductor integrated circuit according to the present invention.

For example, as illustrated in FIG. 12, if the distortion correcting process on image data obtained at an image capturing timing SH1 and writing of the processed image data to the semiconductor memory 35 is finished during a period from the image capturing timing SH1 of the camera to the next image capturing timing SH2, there is no problem. However, as shown in FIG. 13, in the case where the distortion correcting process on image data obtained at the image capturing timing SH1 and writing of the processed image data to the semiconductor memory 35 is not finished during the period from the image capturing timing SH1 of the camera to the next image capturing timing SH2, an image cannot be smoothly displayed in the display device 36. To address the problem, as shown in FIG. 15, the processor 10 is provided with a general port 151 coupled to the bus 22 and a terminal T7 for transmitting an output signal from the general port 151 to the cameras 31 to 34. From the general port 151 via the terminal T7, a camera sync signal is transmitted to the cameras 31 to 34. It is assumed that the camera sync signal is output in pulses in such a manner that, after the image processing modules (IMRs) 15 to 18 complete the data process on one screen, the central processing unit 20 sets a predetermined value in the general port. The cameras 31 to 34 perform the image capturing synchronously with the camera sync signal which is transmitted via the terminal T7. With such a configuration, for example, as illustrated in FIG. 14, after the image processing modules (IMRs) 15 to 18 complete the data process on one screen, the image capturing in the cameras 31 to 34 can be performed at the image capturing timing SH2 synchronously with the camera sync signal. Consequently, an image can be displayed smoothly in the display device 36.

Although the present invention achieved by the inventors herein have been concretely described above on the basis of the embodiments, obviously, the invention is not limited to the embodiments but can be variously changed without departing from the gist.

For example, an overview image may be generated by performing a viewpoint converting process as described in the patent document 1 on distortion-corrected image data in the process block 43 in the image processing modules 15 to 18.

What is claimed is:

1. A semiconductor integrated circuit on a single semiconductor substrate and for use with a plurality of cameras and a semiconductor memory, comprising:
 a plurality of first interfaces configured to fetch first image data captured by the plurality of cameras, respectively; and
 a plurality of image processing modules coupled to the plurality of first interfaces and each said image processing module being configured to perform a predetermined data process on the first image data received from the corresponding first interface and being configured to output corrected image data by
  extracting second image data from a pre-designated region of the first image data fetched by the corresponding first interface;
  performing distortion correction on the extracted second image data to provide the corrected image data; and
  writing the corrected image data into the semiconductor memory via a bus and a second interface,
 wherein the bus is coupled to outputs of the plurality of image processing modules, and
 wherein the second interface is coupled to the bus and configured to transmit the corrected image data to the semiconductor memory and to receive the corrected image data from the semiconductor memory.

2. The semiconductor integrated circuit according to claim 1, further comprising:
 a display control unit configured to fetch the corrected image data stored in the semiconductor memory, synthesize the corrected image data, and display the resultant image data on a display device.

3. The semiconductor integrated circuit according to claim 2, wherein each of the plurality of image processing module includes:
 a line memory for storing image data received via the corresponding first interface;
 a display list buffer for storing a display list; and
 a process block for performing the distortion correction on image data in the line memory in accordance with the display list.

4. The semiconductor integrated circuit according to claim 3,
 wherein the display list includes:
 a first command for instructing coordinate transformation of image data stored in the line memory and storage of the coordinate-transformed image data into the semiconductor memory;
 a second command for making execution of a next display list wait until a predetermined condition is satisfied; and
 a third command for generating a predetermined interruption signal at a timing point when image data of one screen is obtained by process in the process block, and the process block executes the first, second, and third commands.

5. The semiconductor integrated circuit according to claim 4, further comprising:
 a central processing unit coupled to the bus,
 wherein the central processing unit is configured to write corresponding image data in the semiconductor memory into the display control unit via the bus by an interrupting process corresponding to an interruption signal caused by the third command in the display list.

6. The semiconductor integrated circuit according to claim 5, further comprising:
 a port which outputs a sync signal for controlling the image capturing timings of the cameras.

7. A multi-angle video system comprising:
 first to fourth cameras each with a fish-eye lens;
 a memory;
 a display panel; and
 a semiconductor integrated circuit on a single semiconductor substrate, the semiconductor integrated circuit comprising
  first to fourth terminals to which the first to fourth cameras are coupled, respectively;
  first to fourth interfaces coupled to the first to fourth terminals, respectively, and each configured to fetch first image data captured by the plurality of cameras, respectively;
  first to fourth image processing modules coupled to the first to fourth interfaces, respectively, and each configured to extract second image data from a predetermined area of the first image data fetched by a corresponding one of the first to fourth interfaces;
perform distortion correction on the extracted second image data to provide the corrected image data; and
output the corrected image data to be written to the memory;
a bus coupled to the first to fourth image processing modules;
a fifth terminal coupled to the memory;
a fifth interface coupled between the bus and the fifth terminal, the corrected image data from the first to fourth image processing modules being written to the memory via the bus and the fifth interface;
a sixth terminal coupled to the display panel; and
a display control unit coupled between the bus and the sixth terminal, the corrected image data in the memory being provided to the display panel as ff-display data via the fifth interface, the bus, and display control unit.

8. The multi-angle video system according to claim 7, wherein
the first camera is associated with a front side of a vehicle,
the second camera is associated with a rear side of the vehicle,
the third camera is associated with a right side of the vehicle, and
the fourth camera is associated with a left side of the vehicle.

9. The multi-angle video system according to claim 8, wherein
the second image processing module is configured to perform a 180 degree coordinate transformation function on the corrected image data and to write a resultant image in the memory,
the third image processing module is configured to perform a rightward 90 degree coordinate transformation function on the corrected image data and to write a resultant image in the memory, and
the fourth image processing module is configured to perform a leftward 90 degree coordinate transformation function on the corrected image data and to write a resultant image in the memory.

* * * * *